United States Patent [19]

Sullivan et al.

[11] Patent Number: 5,468,108
[45] Date of Patent: Nov. 21, 1995

[54] SPIRAL FLEX TREE FASTENER

[75] Inventors: Kathleen A. Sullivan, Kankakee; Brian R. Peek, Mokena, both of Ill.

[73] Assignee: Illinois Tool Works Inc., Glenview, Ill.

[21] Appl. No.: 304,154

[22] Filed: Sep. 12, 1994

[51] Int. Cl.⁶ ........................................... F16B 19/00
[52] U.S. Cl. ........................ 411/510; 411/908; 411/913
[58] Field of Search .................................. 411/508, 509, 411/510, 908, 913

[56] References Cited

U.S. PATENT DOCUMENTS

| | | | |
|---|---|---|---|
| 4,381,633 | 5/1983 | MacLeod | 52/473 |
| 4,396,329 | 8/1983 | Wollar | 411/508 |
| 4,402,641 | 9/1983 | Arff | 411/510 |
| 4,427,328 | 1/1984 | Kojima | 411/508 |
| 4,728,438 | 3/1988 | Chisholm et al. | 411/510 |
| 4,776,739 | 10/1988 | Hamman | 411/510 |
| 4,900,210 | 2/1990 | Buchanan et al. | 411/510 X |
| 4,902,182 | 2/1990 | Lewis | 411/510 |
| 4,938,645 | 7/1990 | Wollar | 411/508 |
| 5,039,267 | 8/1991 | Wollar | 411/508 |
| 5,306,098 | 4/1994 | Lewis | 411/510 |

Primary Examiner—Neill R. Wilson
Attorney, Agent, or Firm—Schwartz & Weinrieb

[57] ABSTRACT

A spiral flex tree fastener, for use in securing a component to a panel by insertion into a hole provided therein, has a head, and a shank extending axially therefrom and ending in a conical rounded point. The head, shank, and point share a common axis, the head naturally being of greater diameter than the shank and point. The point has a maximum diameter substantially equal to the hole into which the fastener may be inserted. The shank is flattened, has two sides and a flange running axially along each of the two sides. The shank has a diagonally measured width equivalent to the maximum diameter of the point and merges smoothly thereinto, and the flanges ensure that the fastener remains centered in the appropriately sized hole into which it may be inserted. On each side of the shank are a plurality of flexible fins set at an oblique angle with respect to the axis of the fastener. A portion of each fin extends radially outward from the axis of the shank beyond the radial extent of the conical rounded point. The fins flex against the walls of the appropriately sized hole, securing the fastener therein, and are shaped to make its nondestructive withdrawal, if desired or necessary, possible but more difficult to effect than its original insertion.

20 Claims, 6 Drawing Sheets

SPIRAL FLEX TREE FASTENER

BACKGROUND OF THE INVENTION

1. Field of The Invention

The present invention is directed toward the fastener art and, more particularly, to a fastener of the type generally referred to as a "push-in" or "drive" fastener.

2. Description of the Prior Art

"Push-in" or "drive" fasteners of a variety of types and styles are well known in the art. Typically, they are arranged to be driven axially into preformed openings in a work piece and to engage the workpiece by virtue of laterally extending flexible tabs or wing-like members. The work piece may be a panel of a particular type, the fastener being used in the particular case to secure another panel, or strip of molding or the like, thereto.

Fasteners of this variety are often referred to as tree fasteners because the flexible tabs or wing-like members extend outwardly from a shank as branches do from the trunk of a tree.

Ongoing problems with such fasteners include the relationship between the installation or insertion forces and the removal forces. Ideally, it would be desirable in many situations to have a design wherein the insertion forces are extremely low and the removal forces extremely high. In many prior art designs, these forces are nearly equal. Attempts to reduce the forces resisting installation while increasing the forces resisting removal have typically involved changing the shape of the tabs, their angle of inclination, or their manner of connection to the fastener shank. These changes have generally been of marginal value.

Other problems include the difficulty in maintaining the fastener centered in a hole, so that it may have less of a tendency to wander out. Further, it has always been difficult to keep the tabs flexed inside the hole to discourage rattle and rotation without including an overdrive feature, such as a resiliently collapsible head in the shape of an umbrella.

The prior art is replete with tree-type fasteners. For illustration, U.S. Pat. No. 4,728,238 shows a one-piece drive fastener having a head and a shank, the shank including a generally non-circular cross section presenting a plurality of generally flat, axially extending surfaces. Each of the flat surfaces on the shank carry a plurality of axially spaced flexible resilient wing elements; the wings being flexed along the straight line connection with the flat surfaces. Certain wings extending from and positioned in spaced relation along at least one of said surfaces are angularly disposed so as to tilt in the direction of the head and further include means formed integrally with each of the certain wings to substantially increase the force required for removal of the fastener from a cooperating aperture as compared to the force required to introduce the fastener into the aperture. Nevertheless, this fastener is not self-centering, and tends to walk out of the holes when shifted back and forth. Forces required for its removal are inconsistent in value.

U.S. Pat. No. 4,776,739 shows a one-piece plastic reusable push-in fastener for insertion into an aperture in a workpiece comprising a head portion and a shank portion, the shank portion being integrally formed on one side of the head portion with its longitudinal axis extending away from the head portion and having a particular cross section, and a transversely extending fin section intermediate the length of the shank on one side thereof whereby the fin section cooperates with the particular shank cross section to inhibit withdrawal of the fastener from a particular workpiece aperture and to centrally align the longitudinal axis of the shank with the central axis of the aperture by forcing the periphery of the shank cross section against the inner wall of the workpiece aperture. While this fastener is self-centering, it makes minimal contact with the wall of the aperture. As a consequence, the fastener is able to rock in thin panels. The ratio between the forces required for removal and insertion is also very low, being close to 1:1.

In short, a tree-type fastener having the ability to remain centered in its hole, as well as the ability to remain flexed in the hole without the use of an overdrive, which is much more difficult to remove than to insert into the hole, has been long-sought in the art. Such a fastener is provided by the present invention.

SUMMARY OF THE INVENTION

The present invention is a spiral flex tree fastener which may be removably inserted into a hole in a panel, and has a removal force greater than an insertion force with respect to the hole. The fastener has potential application in many industries, such as, for example, in the automobile manufacturing industry, where it may be used to attach door panels and interior trim, or as a fastener for brake and fuel line clips.

The spiral flex tree fastener has a head and an elongated shank having an axis and extending axially from the head. The elongated shank has a cross section whose maximum extent is substantially equal to the maximum extent of the hole in which the fastener is intended to be inserted. As a consequence, when the fastener is inserted into such a hole, the elongated shank fits snugly in the hole. This aspect of the present invention provides a decided advantage over many prior-art fasteners.

The elongated shank has a plurality of flexible fins disposed thereon at an oblique angle with respect to the axis of the shank. Each of the fins has a portion which extends, when measured radially from the axis of the shank, a distance greater than that from the axis to the edge of the intended hole, so that the fins may flex against the walls of that hole and may spring out inside the panel upon passage through the hole to hold the fastener firmly therein and to inhibit its unintentional removal therefrom.

BRIEF DESCRIPTION OF THE DRAWINGS

The present invention will now be described in more complete detail with frequent reference being made to the several figures to be identified immediately below in which like reference characters designate like or corresponding parts throughout the several views, and wherein.

DETAILED DESCRIPTION OF THE ILLUSTRATED EMBODIMENTS

Figure 1:
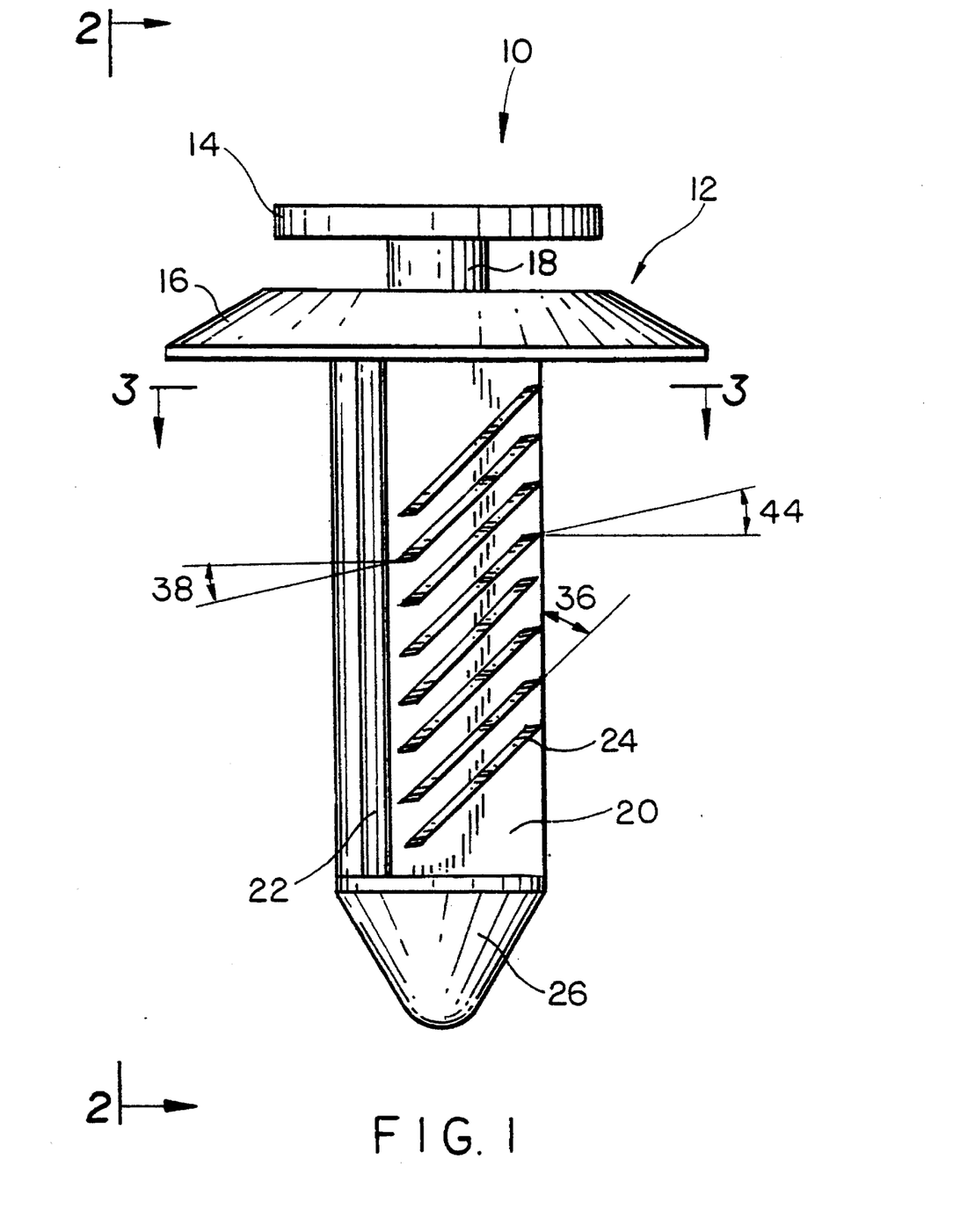
FIG. 1 is a side elevation view of a preferred embodiment of the spiral flex tree fastener of the present invention.

FIG. 1 is a side elevation view of a preferred embodiment of the spiral flex tree fastener 10 of the present invention. The fastener 10 has a head 12 having an upper head portion 14 and a lower crowned head portion 16 with an axial spacer 18 therebetween.

Extending axially from head 12, and sharing a common axis therewith, is a flattened shank 20. A flange 22 extends axially along the flattened shank 20; another flange 22, not visible in FIG. 1, extends axially along the other side of shank 20. On each side of the flattened shank 20 are a plurality of flexible fins 24 set at an oblique angle with respect to the axis of the shank 20. The fins 24 are planar and may be parallel to one another. Further, fins 24 may be set perpendicularly to shank 20, or at an angle thereto.

The spiral flex tree fastener 10 also has a conical rounded point 26, which also shares a common axis with flattened shank 20. The conical rounded point 26 has a maximum diameter equal to the width, as seen in FIG. 1, of flattened shank 20, both of which are substantially equal to the hole in which fastener 10 may be used.

Figure 2:
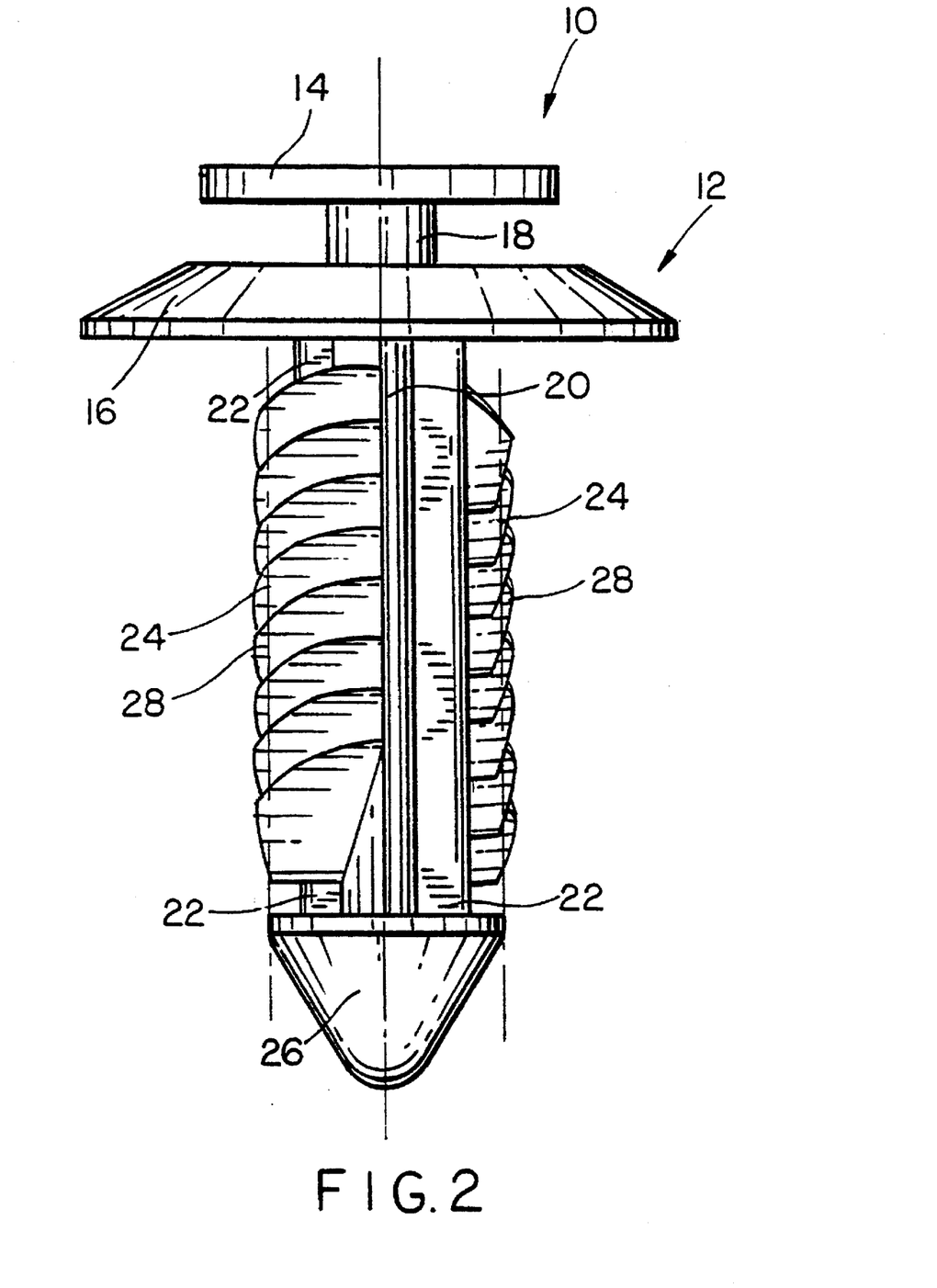
FIG. 2 is another side elevation view of the preferred embodiment taken as indicated by line 2—2 in FIG. 1.

Leaving FIG. 1 for a moment, FIG. 2 is another side elevation view of the spiral flex tree fastener 10 taken from the left toward the right in FIG. 1 as indicated by line 2—2 therein. Flexible fins 24 may be seen on both sides of flattened shank 20; those on the left side of flattened shank 20 are inclined downwardly away from the viewer, while those on the right side are inclined downwardly toward the viewer. Most importantly, for the purposes of our present discussion, a portion 28 of each fin 24 extends outwardly from the flattened shank 20 beyond the maximum extent of the conical rounded point 26. Those portions 28 are designed to interfere with the walls of the hole, whose diameter is substantially equal to the maximum diameter of the conical rounded point 26, by flexing thereagainst and by snapping out therebehind, so that the spiral flex tree fastener 10 may remain immovably fixed within that hole.

It may be readily appreciated by those of ordinary skill in the art that the flexible fins 24, set, as they are, obliquely on the flattened shank 20, each have a certain extent in the axial direction, as opposed to the fins in prior-art fasteners which have outer edges perpendicular to the axis of the fastener. As a consequence, even when the fastener 10 is inserted into a hole through a thin panel, some of the flexible fins 24 will always be flexed against the walls thereof. This feature of the present fastener 10 ensures that it will not rattle or rotate, once it has been inserted into a hole of appropriate size.

Further, as the flexible fins 24 have oblique orientations on the flattened shank 20, their flexing will have a radial, as well as an axial component. This permits the fastener 10, and particularly the flexible fins 24, to have a continuous surface contact with the walls of a hole, and makes it unnecessary to provide the fastener with an overdrive feature.

Figure 3:
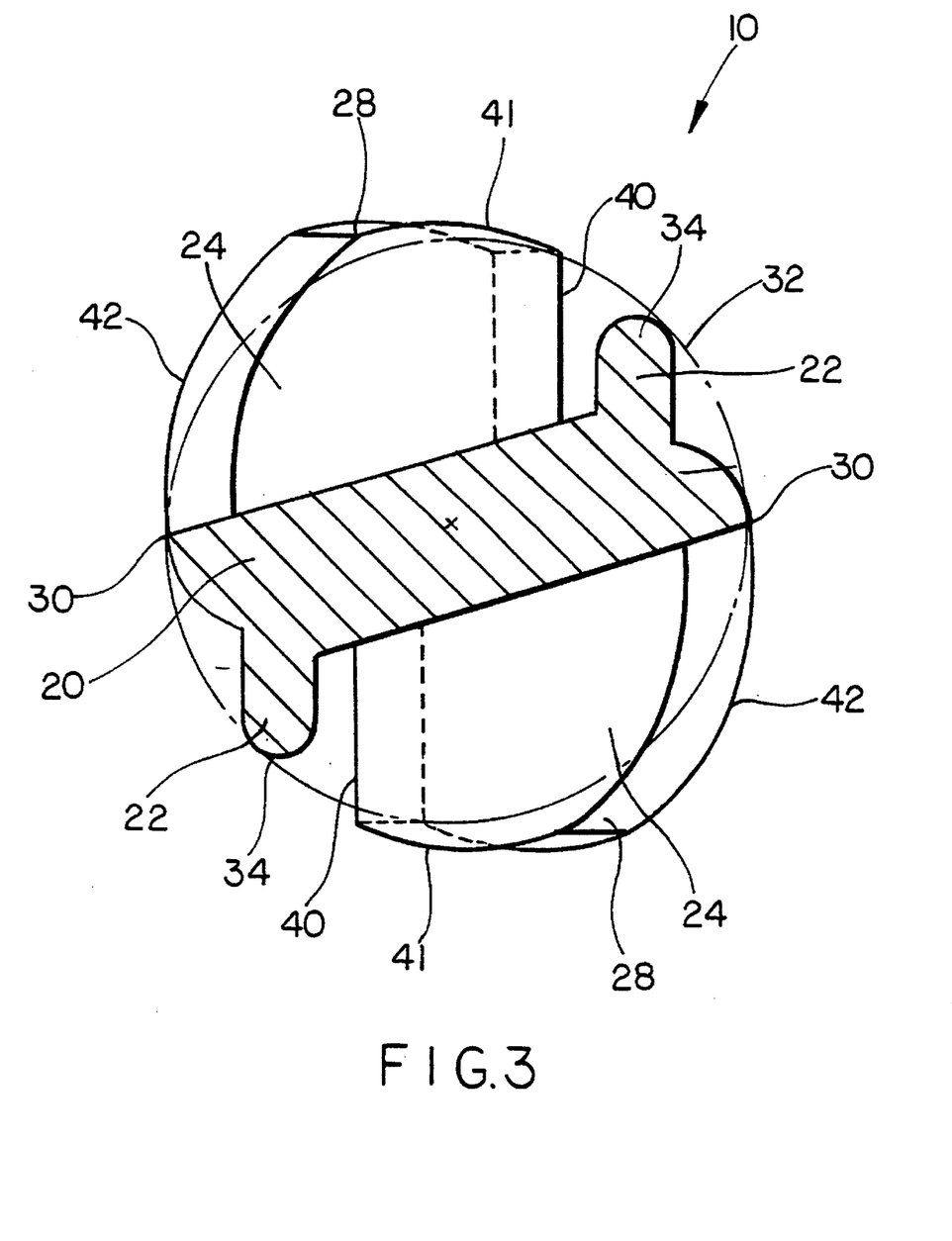
FIG. 3 is a cross section of the preferred embodiment taken as indicated by line 3—3 in FIG. 1.

Turning now to FIG. 3, which is a cross section of the fastener 10 taken as indicated by line 3—3 in FIG. 1, the flattened shank 20 has a width measured thereacross between opposite corners 30, that width being substantially equal to the diameter of the hole, indicated by circle 32, in which fastener 10 is to be used. Flanges 22, which appear as lobes in the cross section, have tips 34 which are separated from one another by the same amount. In this light, it may readily be appreciated that flanges 22 provide fastener 10 with the capacity to remain centered within a hole having substantially the same diameter as circle 32.

Referring to the flexible fins 24, it will be noted that portions 28 lie outside the circumference of circle 32. This characteristic of flexible fins 24, and portions 28 thereof, provide spiral flex tree fastener 10 with the ability to remain fixed in a hole having a diameter substantially equal to that of circle 32 without rotating or rattling.

Referring back to FIG. 1, the flexible fins 24 are included in sufficient number and spacing that there will always be a set of fins flexed inside the hole to discourage rattle, rotation and removal. The relative spacing of the flexible fins 24 also results in a tight fit in panels of many thicknesses. This and the radial flex motion of the fins eliminate the need for a collapsible head in the shape of an umbrella, which can add significant cost to a fastener.

The shank 20, as noted above, is designed to keep the fastener 10 centered in a hole, thereby maximizing and controlling the contact made by the flexible fins 24 with the wall thereof to improve retention.

The insertion force and removal force of the fastener 10 may be predetermined by varying its design parameters.

Turning first to parameters which will bear on the insertion force, the amount by which portions 28 of flexible fins 24 extend beyond the circumference of a hole of which the fastener 10 is designed, and thus interfere with the walls thereof, has a direct bearing on the insertion force.

Reducing angle 36, that is, (the oblique angle made by the flexible fins 24 with the axis of the fastener 10, provides more lead-in and allows the fins 24 to flex more easily, thereby lowering insertion force. Also, by reducing the thickness of the fins 24, insertion force will be lowered as thin fins 24 will flex more easily.

Finally, by increasing angle 38, that is the acuteness of the edge 40 of the fins 24, the fins 24 will be forced to flex in the radial direction.

It should be understood that, during insertion, flexible fins 24 passing completely through the hole will be released from flexing and will reassume a plane condition on the underside of the panel. Referring now to FIG. 3, the insertion leading edge 41 makes contact with the walls of the hole far from flattened shaft 20. This ensures that, upon insertion, the fins 24 will be readily flexed to permit the relatively easy insertion of the fastener 10 thereinto.

In contrast, the removal leading edge 42 of fin 24 makes contact with the walls of the hole, when being drawn out from inside the panel, close to the flattened shank 20. This will inhibit the flexing of the fins 24 upon withdrawal, and will increase the retention force. It should be noted, in passing, that the removal leading edge 42, as shown in FIG. 3, may be a segment of a circle.

Several other factors will increase the retention force. Again, as before, by increasing the amount by which portions 28 of flexible fins 24 extend beyond the circumference of a hole for which the fastener 10 is designed, greater interference will be provided and the removal forces will increase.

By decreasing angle 36, that is, by making the oblique angle made by the flexible fins 24 with the axis of the fastener 10 smaller, the fins 24 will be flexed less readily and will prevent the fastener 10 from being withdrawn from the hole. Of course, by increasing the thickness of the fins 24, the removal force will be increased, as thicker fins 24 will be stiffer and less likely to flex.

Finally, by decreasing angle 44, that is, the acuteness of the removal leading edge 42 of the fins, the fins 24 will be prevented from flexing making removal more difficult.

Figure 4:
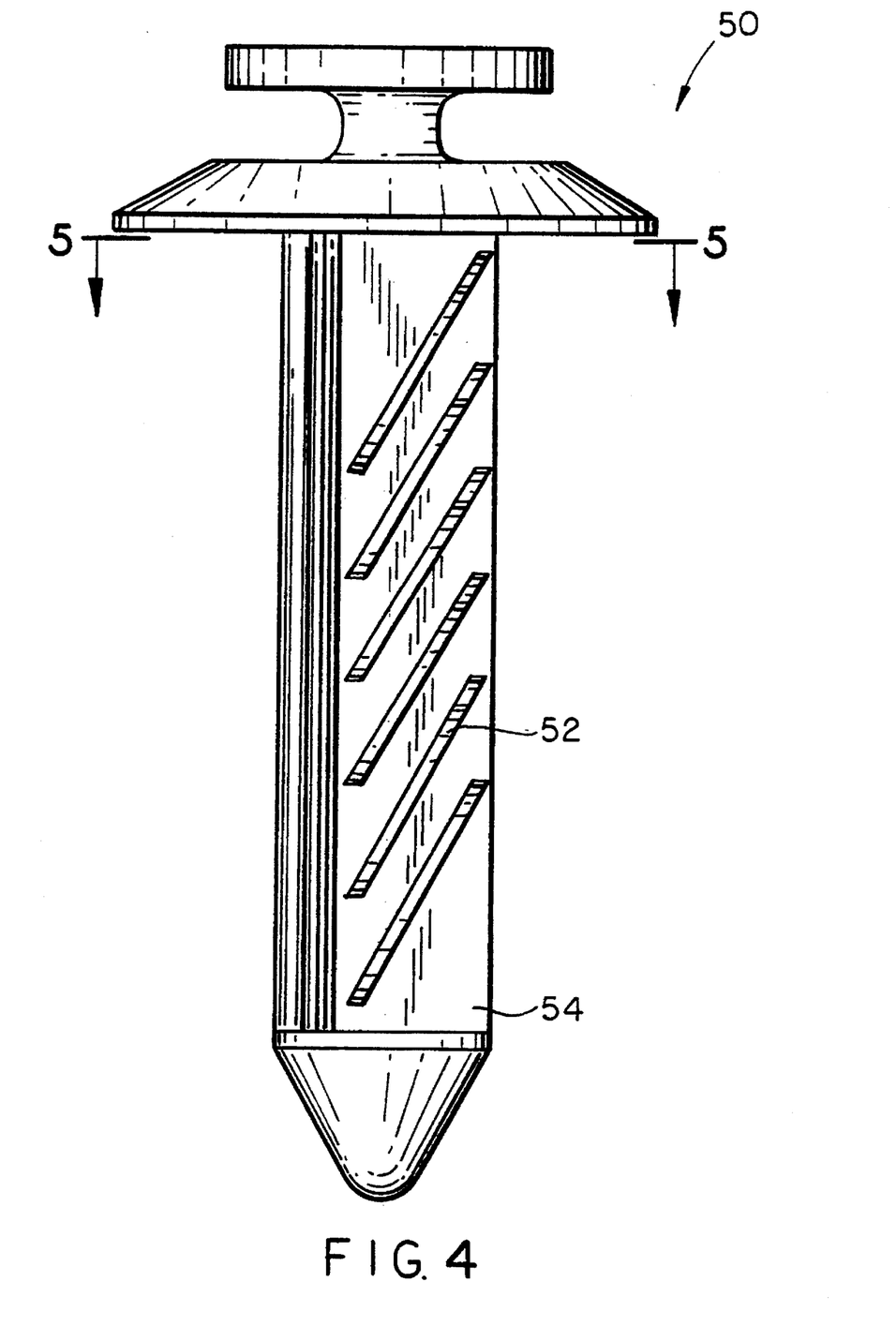
FIG. 4 is a side elevation view of an alternate embodiment of the spiral flex tree fastener of the present invention.

Turning now to FIGS. 4 through 7, these show two alternate embodiments which will be described to the extent that they differ from that shown in FIGS. 1 through 3 for the purpose of drawing a contrast therewith. FIG. 4 shows a first alternate embodiment of the spiral flex tree fastener 50 having only six, as opposed to eight, flexible fins 52 on each side of flattened shank 54. Flexible fins 52 may be observed to be at a smaller oblique angle with respect to the axis of fastener 50 than was the case in FIG. 1.

Figure 5:
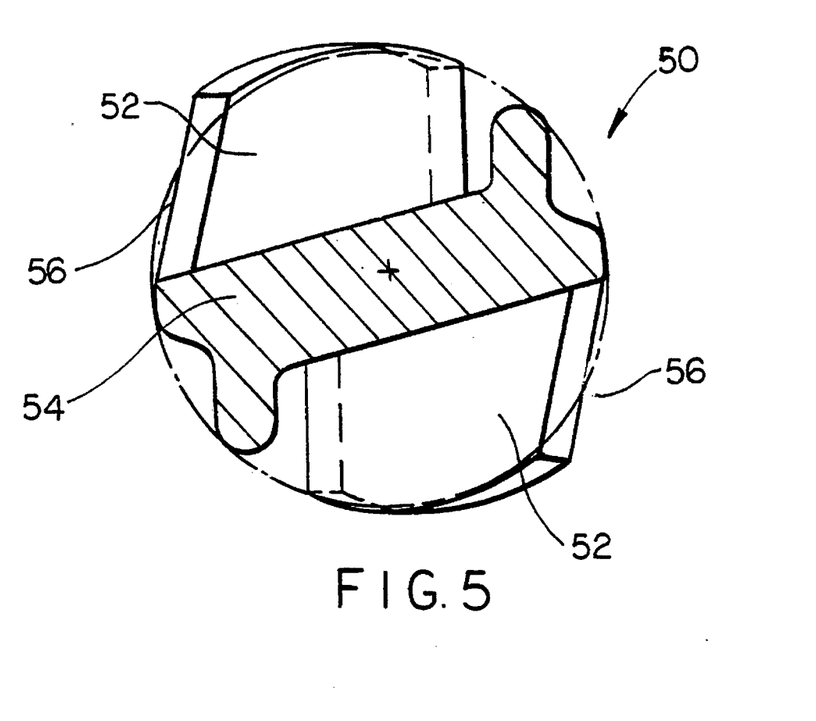
FIG. 5 is a cross section of the embodiment shown in FIG. 4 taken as indicated by line 5—5 in that FIG.

FIG. 5 is a cross section of fastener 50 taken as indicated by line 5—5 in FIG. 4. The removal leading edge 56 of each 13 fin 52 may be seen to be straight, as opposed to the curved removal leading edges 42 shown in FIG. 3.

Figure 6:
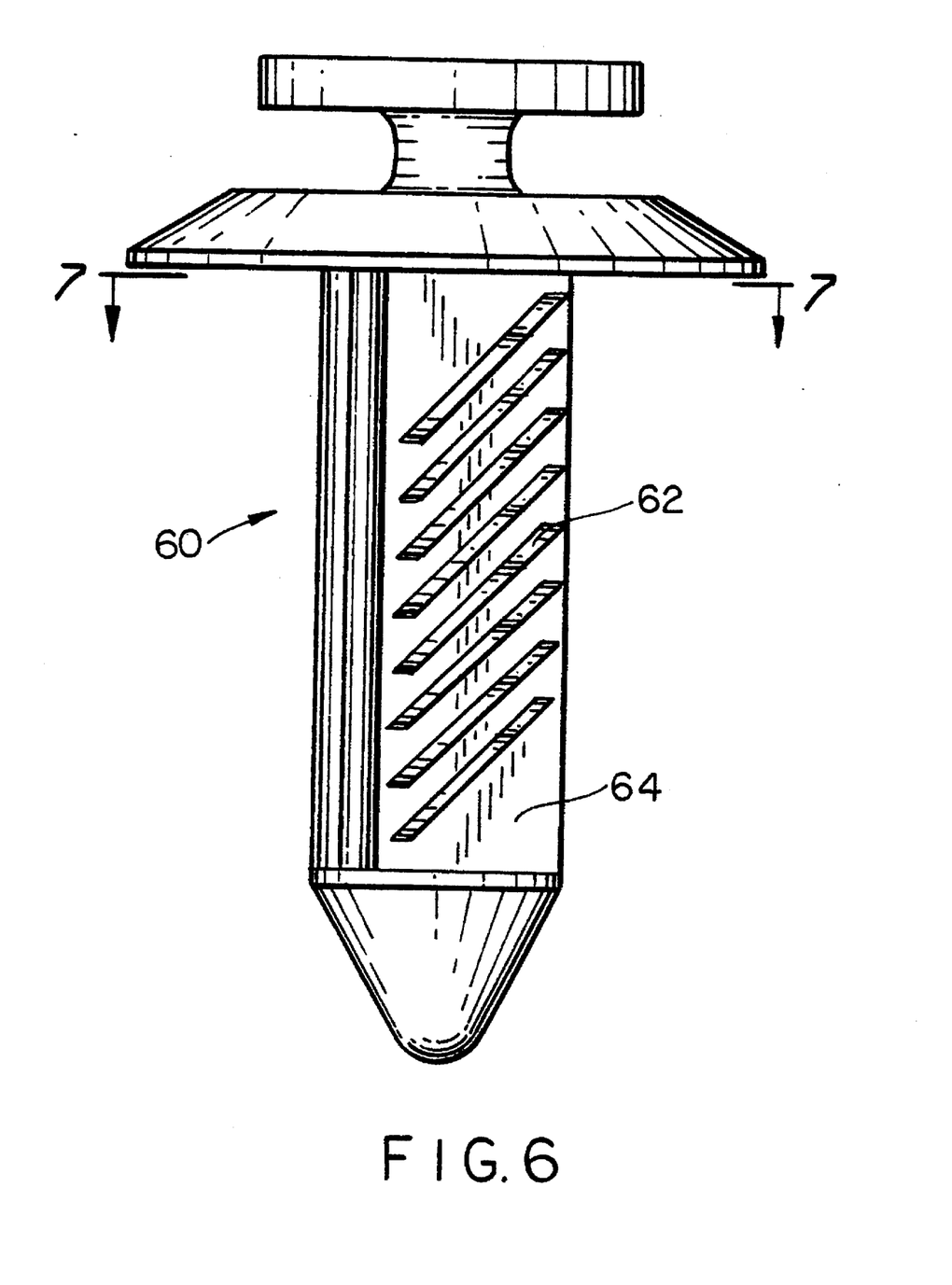
FIG. 6 is a side elevation view of yet another embodiment of the present invention.

FIG. 6 shows a second alternate embodiment of the spiral flex tree fastener 60. Like the embodiment shown in FIG. 1, fastener 60 has eight flexible fins 62 on flattened shank 64 set at an oblique angle.

Figure 7:
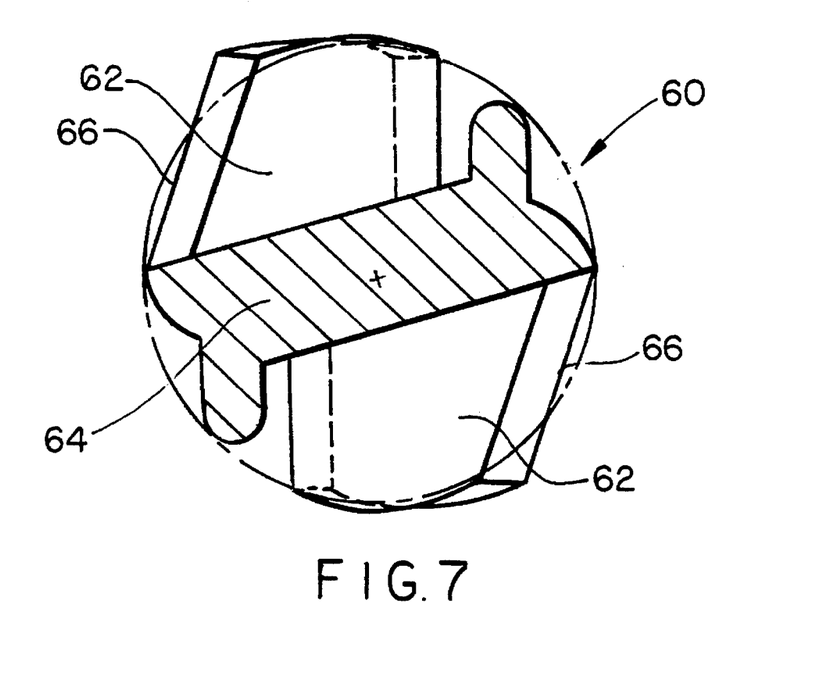
FIG. 7 is a cross section of the embodiment shown in FIG. 6 taken as indicated by line 7—7 in that FIG.

FIG. 7 is a cross section of fastener 60 taken as indicated by line 7—7 in FIG. 6. The shape of fins 62 is substantially identical to that of fins 52 in FIG. 5, except that removal leading edge 66 makes a smaller angle with flattened shank 64 than removal leading edge 56 does with flattened shank 54.

The fasteners of the present invention may be used in place of most so-called Christmas-tree fasteners because of their versatility. It is intended for applications with wide panel thickness variation, especially where overdrive is a problem due to space constraints, or where the higher insertion forces needed for overdrive are undesirable.

In the automotive industry, the present fasteners may be used to attach door panels and interior trim, or as a fastener for brake and fuel line clips. They can also be used in spiral-weld applications, where tree fasteners are currently used, as well as in many other applications.

The present fasteners may be injection molded from any of the polymeric resin, or plastic, materials commonly used for the manufacture of tree fasteners by those of ordinary skill in the art. Nylon is but one example of a suitable material.

In summary, the present spiral flex tree fasteners, so-called because the oblique orientation of the flexible fins is suggestive of spirals about the shank, have as advantages: a smooth, nonincremental installation; low insertion and high retention forces; the ability to be customized to meet the specific needs of an application; reusability; no overdrive required; tight fit in all panel thicknesses without rattle or rotation; robustness; ease in manufacture and tooling; low cost; self-centering; and consistency.

Modifications to the present fasteners would be obvious to those of ordinary skill in the art, but would not bring the fastener so modified beyond the scope of the claims to follow.

It is therefore to be understood that within the scope of the appended claims, the present invention may be practiced otherwise than as specifically described herein.

What is claimed is:

1. A spiral flex tree fastener for removable insertion into a hole defined within a panel, comprising:

a head;

an elongated shank having a longitudinal axis and extending axially from said head; and two sets of substantially planar, flexible fins disposed upon opposite sides of said elongated shank, said flexible fins being disposed parallel to each other within each one of said sets of fins, each one of said sets of fins extending axially along said elongated shank, each one of said fins within each one of said sets of fins being disposed at a predetermined angle with respect to said longitudinal axis of said elongated shank such that said fins within said two sets of fins together define spiral loci about said fastener shank and about said longitudinal axis of said fastener shank, and each one of said flexible fins having a radial extent which is greater than the radial distance extending between an edge portion of said hole and said longitudinal axis of said elongated shank so that when said fastener is inserted into said hole, said flexible fins will flex against the walls of said panel defining said hole so as to hold said fastener therein.

2. A spiral flex tree fastener as claimed in claim 1, wherein:

each one of said flexible fins within each one of said sets of fins has an upper end and a lower end, said upper end of each one of said flexible fins being closer to said head than said lower end of each one of said flexible fins; and wherein a portion of each one of said flexible fins, having said radial extent which is greater than said radial distance extending from said edge portion of said hole to said longitudinal axis of said elongated shank, is closer to said upper end than to said lower end.

3. A spiral flex tree fastener as claimed in claim 1 wherein said head comprises a lower resilient head portion adjacent to said elongated shank and an upper head portion connected to but axially spaced from said lower head portion.

4. A spiral flex tree fastener as claimed in claim 1 wherein said elongated shank narrows to a point at an end opposite to said head.

5. A spiral flex tree fastener as claimed in claim 1 wherein said elongated shank has a flattened cross section.

6. A spiral flex tree fastener as claimed in claim 1 wherein at least one of said two sides of said elongated shank further comprises an axially extending flange.

7. A spiral flex tree fastener as claimed in claim 1 further comprising a conical rounded point at an end of said elongated shank which is disposed opposite from said head.

8. A spiral flex tree fastener as claimed in claim 1 wherein said elongated shank has a cross section whose maximum extent is substantially equal to the maximum extent of said hole, so that said elongated shank may fit snugly in said hole when inserted therein and said axis of said elongated shank may remain at a fixed distance relative to the center of said hole.

9. A spiral flex tree fastener as set forth in claim 1, wherein:

each one of said fins has an insertion leading edge portion which defines a predetermined angle with respect to said longitudinal axis of said elongated shank so as to predetermine the insertion force characteristic of said fastener.

10. A spiral flex tree fastener as set forth in claim 1, wherein:

each one of said fins has a removal force leading edge portion which defines a predetermined angle with respect to said longitudinal axis of said elongated shank so as to predetermine the removal force characteristic of said fastener.

11. A spiral flex tree fastener as set forth in claim 1, wherein:

each one of said sets of fins comprises eight fins.

12. A spiral flex tree fastener as set forth in claim 1, wherein:

each one of said sets of fins comprises six fins.

13. A spiral flex tree fastener as set forth in claim 1, wherein:

said fastener is fabricated from a polymeric resin.

14. A spiral flex tree fastener for removable insertion into a hole defined within a panel, comprising:

a head;

an elongated shank having a longitudinal axis and extending axially from said head; and two sets of substantially planar, flexible fins disposed upon opposite sides of said elongated shank, said flexible fins being disposed parallel to each other within each one of said sets of fins, each one of said sets of fins extending axially along said elongated shank, each one of said fins within each one of said sets of fins being disposed at a predetermined angle with respect to said longitudinal axis of said elongated shank such that the intersection of each one of said fins with said elongated shank defines a locus which is disposed at a predetermined oblique angle with respect to said longitudinal axis of said elongated shank, and each one of said flexible fins has a radial extent which is greater than the radial distance defined between an edge portion of said hole and said longitudinal axis of said elongated shank so that when said fastener is inserted into said hole, said flexible fins will flex against the walls of said panel defining said hole so as to retain said fastener therein.

15. A spiral flex tree fastener as set forth in claim 14, wherein:

said elongated shank has a rounded conical end opposite said head.

16. A spiral flex tree fastener as set forth in claim 14, wherein:

each one of said flexible fins within each one of said sets of fins has an upper end and a lower end wherein said upper end of each one of said flexible fins is disposed closer to said head than said lower end of each one of said flexible fins.

17. A spiral flex tree fastener as set forth in claim 14, wherein:

said elongated shank has a flattened cross-sectional configuration.

18. A spiral flex tree fastener as set forth in claim 14, further comprising:

axially extending flange means integrally formed upon opposite sides of said elongated shank for engaging sidewall portions of said hole defined within said panel so as to maintain said fastener substantially centered within said hole of said panel.

19. A spiral flex tree fastener as set forth in claim 14, wherein:

each one of said fins has an insertion leading edge portion which defines a predetermined angle with respect to said longitudinal axis of said elongated shank so as to predetermine the insertion force characteristic of said fastener.

20. A spiral flex tree fastener as set forth in claim 14, wherein:

each one of said fins has a removal force leading edge portion which defines a predetermined angle with respect to said longitudinal axis of said elongated shank so as to predetermine the removal force characteristic of said fastener.

* * * * *